United States Patent
Allard et al.

(10) Patent No.: US 12,503,113 B2
(45) Date of Patent: Dec. 23, 2025

(54) VEHICLE TRANSMISSION BRAKE CREEP

(71) Applicant: FCA US LLC, Auburn Hills, MI (US)

(72) Inventors: Corey A Allard, Fenton, MI (US);
Michael A Cooper, Howell, MI (US);
Joseph M Johnson, Grand Blanc, MI (US)

(73) Assignee: FCA US LLC, Auburn Hills, MI (US)

( * ) Notice: Subject to any disclaimer, the term of this patent is extended or adjusted under 35 U.S.C. 154(b) by 339 days.

(21) Appl. No.: 18/362,113

(22) Filed: Jul. 31, 2023

(65) Prior Publication Data

US 2024/0051538 A1 Feb. 15, 2024

Related U.S. Application Data

(60) Provisional application No. 63/397,960, filed on Aug. 15, 2022.

(51) Int. Cl.
*B60W 30/18* (2012.01)

(52) U.S. Cl.
CPC .............. *B60W 30/18063* (2013.01); *B60W 2510/0657* (2013.01)

(58) Field of Classification Search
CPC ... B60W 2510/0657; B60W 30/18063; B60W 30/18027
See application file for complete search history.

(56) References Cited

U.S. PATENT DOCUMENTS

| | | | | |
|---|---|---|---|---|
| 2010/0161188 A1* | 6/2010 | Turski | ............... | B60T 8/175 701/67 |
| 2013/0311055 A1* | 11/2013 | Whitney | ............... | B60W 10/06 701/54 |
| 2015/0266479 A1* | 9/2015 | Blakeway | ....... | B60W 30/18027 477/92 |
| 2017/0203760 A1* | 7/2017 | Sowards | ............. | B60W 10/184 |
| 2018/0099673 A1* | 4/2018 | Pedlar | ............. | B60W 10/08 |
| 2021/0016774 A1* | 1/2021 | Cho | ............. | B60W 10/08 |

\* cited by examiner

*Primary Examiner* — Khoi H Tran
*Assistant Examiner* — Tristan J Greiner
(74) *Attorney, Agent, or Firm* — Jeremy J. Klobucar

(57) ABSTRACT

A launch control system for a vehicle having a powertrain includes a transmission configured to selectively perform a transbrake operation to temporarily lock the transmission to hold the vehicle stationary while an engine throttle position is increased for a vehicle launch, an actuator configured to initiate a transbrake creep operation, and a controller in signal communication with the transmission and the actuator. The controller is configured to (i) command the transmission to perform the transbrake operation, (ii) receive a signal from the actuator indicating a request to initiate the transbrake creep operation, and (iii) command the transmission to momentarily disengage the transbrake for a predetermined period of time to enable the vehicle to perform the transbrake creep operation and move the vehicle forward while maintaining the increased engine throttle position.

18 Claims, 3 Drawing Sheets

VEHICLE TRANSMISSION BRAKE CREEP

CROSS-REFERENCE TO RELATED APPLICATION

This application claims the benefit of U.S. Prov. App. No. 63/397,960, filed Aug. 15, 2022, the contents of which are incorporated herein by reference thereto.

FIELD

The present application generally relates to vehicle transmissions and, more particularly, to an automatic transmission brake system for improved vehicle staging.

BACKGROUND

Some of today's higher performance vehicles have powertrains that are so powerful that launch control techniques are preferred to prevent wheel slip and to optimize vehicle performance, particularly for drag racing scenarios. Some launch control systems include a transmission brake feature to hold the vehicle stationary while the engine speed is transitioned to a launch speed. However, such systems may require the driver to manually modulate the throttle pedal while slightly dragging the service brakes to fully stage the vehicle, potentially resulting in launches below the launch engine speed. Accordingly, while such conventional vehicle launch control techniques work for their intended purpose, there exists an opportunity for improvement in the relevant art.

SUMMARY

In accordance with an example aspect of the invention, a launch control system for a vehicle having a powertrain is provided. In one example implementation, the launch control system includes a transmission configured to selectively perform a transbrake operation to temporarily lock the transmission to hold the vehicle stationary while an engine throttle position is increased for a vehicle launch, an actuator configured to initiate a transbrake creep operation, and a controller in signal communication with the transmission and the actuator. The controller is configured to (i) command the transmission to perform the transbrake operation, (ii) receive a signal from the actuator indicating a request to initiate the transbrake creep operation, and (iii) command the transmission to momentarily disengage the transbrake for a predetermined period of time to enable the vehicle to perform the transbrake creep operation and move the vehicle forward while maintaining the increased engine throttle position.

In addition to the foregoing, the described launch control system may include one or more of the following features: wherein the controller is further configured to command a re-engagement of the transbrake after expiration of the predetermined time period; wherein the predetermined period of time is based on a launch RPM of the vehicle to thereby move the vehicle a predetermined distance during the transbrake creep operation; and wherein the predetermined distance is between approximately one and approximately two inches.

In addition to the foregoing, the described launch control system may include one or more of the following features: first and second steering wheel paddle shifters in signal communication with the controller, wherein the actuator is the first steering wheel paddle shifter; wherein the controller is configured to command the transbrake creep operation when the first paddle shifter is engaged during the transbrake operation; and wherein the controller is configured to command the transbrake operation when (i) the first and second steering wheel paddle shifters are engaged, (ii) a brake pedal and an accelerator pedal are subsequently applied, and (iii) the first and second steering wheel paddle shifter are subsequently released.

In addition to the foregoing, the described launch control system may include one or more of the following features: wherein the controller is configured to release the transbrake and launch the vehicle when (i) the transbrake is engaged, (ii) the second paddle shifter is subsequently engaged while maintaining the increased throttle position, and (iii) the second paddle shifter is subsequently released; and wherein during the predetermined period of time, the transbrake is disengaged to a predetermined pressure based on a launch RPM of the vehicle.

In accordance with another example aspect of the invention, a launch control method for a vehicle having a powertrain is provided. In one example implementation, the method includes commanding, by a controller, a transmission to perform a transbrake operation to temporarily lock the transmission to hold the vehicle stationary while an engine throttle position is increased for a vehicle launch; receiving, by the controller, a signal from an actuator indicating a request to initiate a transbrake creep operation; and commanding, by the controller, the transmission to momentarily disengage the transbrake for a predetermined period of time to enable the vehicle to perform the transbrake creep operation and move the vehicle forward while maintaining the increased engine throttle position.

In addition to the foregoing, the described method may include one or more of the following features: commanding, by the controller, a re-engagement of the transbrake after expiration of the predetermined time period; wherein the predetermined period of time is based on a launch RPM of the vehicle to thereby move the vehicle a predetermined distance during the transbrake creep operation; wherein the predetermined distance is less than two inches; wherein the vehicle includes first and second steering wheel paddle shifters in signal communication with the controller, wherein the actuator is the first steering wheel paddle shifter; wherein the controller is configured to command the transbrake creep operation when the first paddle shifter is engaged during the transbrake operation.

In addition to the foregoing, the described method may include one or more of the following features: wherein the controller is configured to command the transbrake operation when the first and second steering wheel paddle shifters are engaged, a brake pedal and an accelerator pedal are subsequently applied, and the first and second steering wheel paddle shifter are subsequently released; wherein the controller is configured to release the transbrake and launch the vehicle when the transbrake is engaged, the second paddle shifter is subsequently engaged while maintaining the increased throttle position, and the second paddle shifter is subsequently released; and wherein during the predetermined period of time, the transbrake is disengaged to a predetermined pressure based on a launch RPM of the vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Described herein are systems and methods for controlling transmission clutch pressure during a transmission brake operation of a vehicle. The systems include a transmission brake ("transbrake") system configured to provide a strategic tie-up or locking of the vehicle automatic transmission to hold the vehicle stationary under a greater drive torque than can be withheld by a typical vehicle foundation brake system. This enables the engine RPM to be increased while the vehicle remains stationary. When the transbrake is released, the vehicle will launch from a standstill at a high RPM and torque, thereby improving vehicle launch performance. The transmission brake system may be the same or similar to that described in commonly owned U.S. Pat. No. 9,873,431, issued on Jan. 23, 2018, the entire contents of which are incorporated herein by reference thereto.

As described herein in more detail, the transbrake system includes a transbrake creep feature that provides the driver with the ability to momentarily toggle the transbrake on and off via the steering wheel paddle. During a drag event, this allows the vehicle to creep/bump forward from the first staging light to the second staging light while keeping the transbrake engaged and the engine in the proper torque window for vehicle launch. In one example, the transbrake is engaged at the first staging light and is allowed to toggle off when the driver momentarily presses a paddle shifter on the steering wheel after reaching the desired launch RPM. The service brake system pressure is only partially removed to maintain a consistently positive preload within the driveline, and the transmission is utilized to push-through the service brake system to perform the creep maneuver. Once the paddle is released, the transbrake re-engages and holds the vehicle stationary without the need for the service brakes. This process enables the vehicle to roll forward (e.g., a few inches) per press of the paddle shifter, thereby simplifying the vehicle staging process and eliminating the need to manually manipulate the service brakes.

Figure 1:
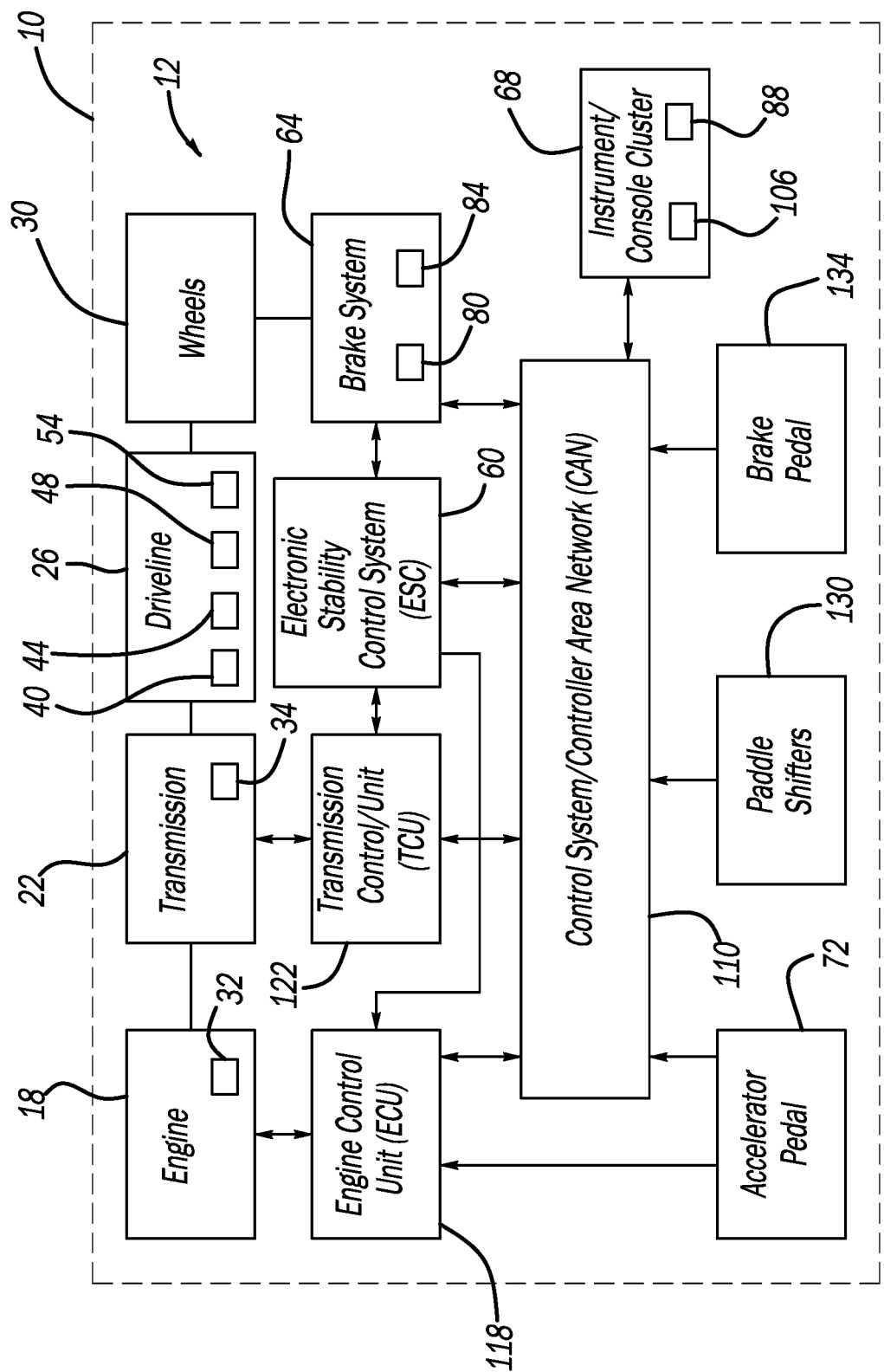
FIG. 1 is a schematic block diagram of an example vehicle system in accordance with the principles of the present application.

With initial reference to FIG. 1, a vehicle 10 having a launch/transbrake control system 12 to provide a transmission brake bump or creep in accordance with the principles of the present disclosure is schematically illustrated. In the example embodiment, the vehicle 10 generally includes an engine 18, a transmission 22 coupled thereto, an associated driveline 26 and wheels 30. The engine 18 and transmission 22 each include various respective sensors 32 and 34, for sensing directly or indirectly parameters such as speed, pressure, temperature, position of clutch members or elements, etc., as is known in the art. Such sensors are in communication with and configured to provide signals to and receive signals or commands from each other and a vehicle control system (discussed below).

The driveline 26 includes, in the exemplary implementation illustrated, a prop shaft 40 having associated bushings and joints 44, axle(s) and/or half shafts 48, such as for front wheels and rear wheels, and snubber plates and/or other travel limiters 54, as is known in the art. The vehicle system 10 also includes an electronic stability control system (ESC) 60, a foundation brake system 64, an instrument panel and/or console 68, an accelerator pedal 72 and a brake pedal 134. The foundation brake system includes an anti-lock braking system (ABS) 80 and one or more wheel speed sensors 84, as is known in the art. The accelerator pedal 72 is for providing a driver input, e.g., a torque request, for engine 18, as is also known in the art.

In the exemplary implementation illustrated in FIGS. 1 and 2, the instrument panel 68 includes a driver/occupant/user interface 88 that includes various soft 92 and/or hard buttons 96 for providing input to the vehicle control system, as will be discussed below in greater detail. The driver interface 88 thus includes an interactive display screen 102 and/or cluster screen display 106 for providing/displaying information to the driver/occupants as well as for facilitating input (such as via the soft keys 92) to the vehicle control system, as is also known in the art.

One or more controllers are utilized to control the various vehicle components or systems discussed above. In one exemplary implementation, various individual controllers are utilized to control the various components/systems discussed herein and are in communication with each other and/or the various components/systems via a main controller and/or local interface 110. In this exemplary implementation, the local interface 110 is one or more buses or other wired or wireless connections, as is known in the art. In the example illustrated in FIG. 2, the local interface 110 is a controller area network (CAN). The CAN 110 may include additional elements or features, which have been omitted for simplicity, such as controllers, buffers (cache) drivers, repeaters and receivers, among many others, to enable communications. Further, the CAN 110 may include address, control and/or data connections to enable appropriate communications among the components/systems described herein and may also be referred to herein as the control system.

Figure 2:
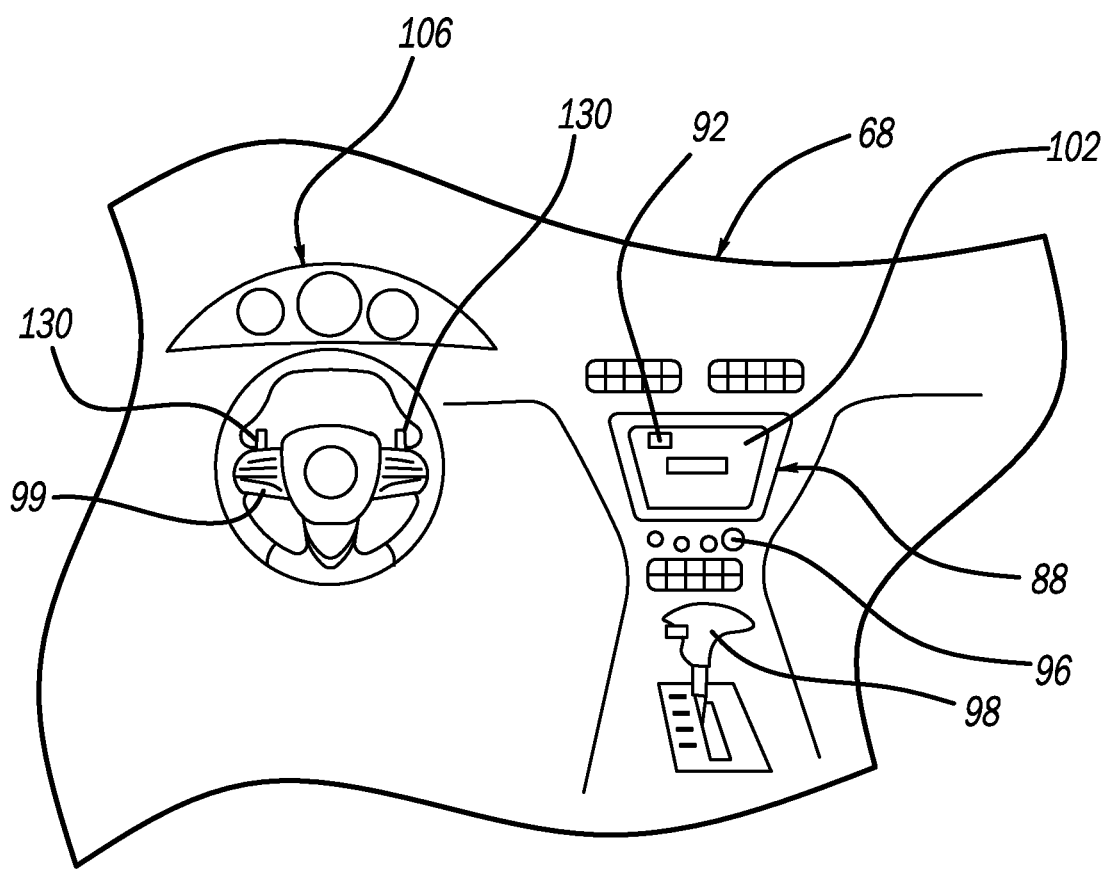
FIG. 2 is a partial schematic illustration of an example vehicle instrument panel and console of the vehicle system of FIG. 1, in accordance with the principles of the present application.

In the example illustrated in FIG. 2, the vehicle system 10 includes an engine control unit (ECU) 118 for controlling engine 18 and a transmission control unit (TCU) 122 for controlling transmission 22. Each of the control units 118, 122 as well as the ABS 80, accelerator pedal 72, instrument/console cluster 68, paddle shifters 130 and brake pedal 134 are in communication with CAN 110 and thus each other. It will be appreciated that while individual control units are discussed herein and shown in various Figures, the individual control units may also be optionally implemented in the form of one control unit, such as a powertrain or vehicle control unit or system. Thus, it will be appreciated that while the discussion will generally continue with reference to the individual controllers discussed above, the discussion is equally applicable to the components of vehicle system 10 being controlled by one controller or vehicle control system.

As previously described, vehicle 10 includes launch/transbrake control system 12 with a transbrake creep feature. The transbrake control system 12 provides a strategic automatic transmission tie-up or temporary locking to hold the vehicle stationary while the engine throttle position is increased. This provides the advantage of increased tractive effort to accelerate the vehicle upon release of the transbrake based on utilization of then stored powertrain energy and increased weight transfer. The transbrake creep feature enables the vehicle 10 to perform one or more forward or rearward creep movements by momentarily toggling the transbrake on and off via the steering wheel paddle 130 while the engine 18 is in the proper torque window for launch.

In one example operation, the transbrake control system 12 may include controller 110 in signal communication with the various components of the vehicle 10. The controller 110 is configured to selectively command a transbrake operation to engage the transbrake and temporarily lock up the transmission 22 when one or more inputs are received from the driver. For example, the controller 110 is configured to command the transbrake operation when the driver engages both paddles 130, presses the brake pedal 134 followed by the accelerator pedal 72, and then releases both paddles 130.

The controller 110 is configured to selectively command the transbrake creep operation when the transbrake is engaged and the driver requests the operation, for example by engaging and releasing one of the paddles 130 (or other actuator). In this operation, the controller 110 commands the transmission 22 to disengage the transbrake to a predetermined pressure for a predetermined time. This enables the vehicle 10 to move forward a predetermined distance to facilitate staging the vehicle 10 during a race. In one example, brake system pressure is only partially released during the creep phase such that vehicle 10 drives through the rear service brake while maintaining positive torque and driveline preload. Once the predetermined time expires, the controller 110 commands the transmission to re-engage the transbrake. Once the vehicle 10 is properly staged, the controller 110 is configured to launch the vehicle 10. For example, the controller 110 is configured to launch the vehicle 10 when the driver engages and holds one of the paddles 130 while maintaining wide open throttle via the accelerator pedal 72, and subsequently releases the paddle 130.

Figure 3:
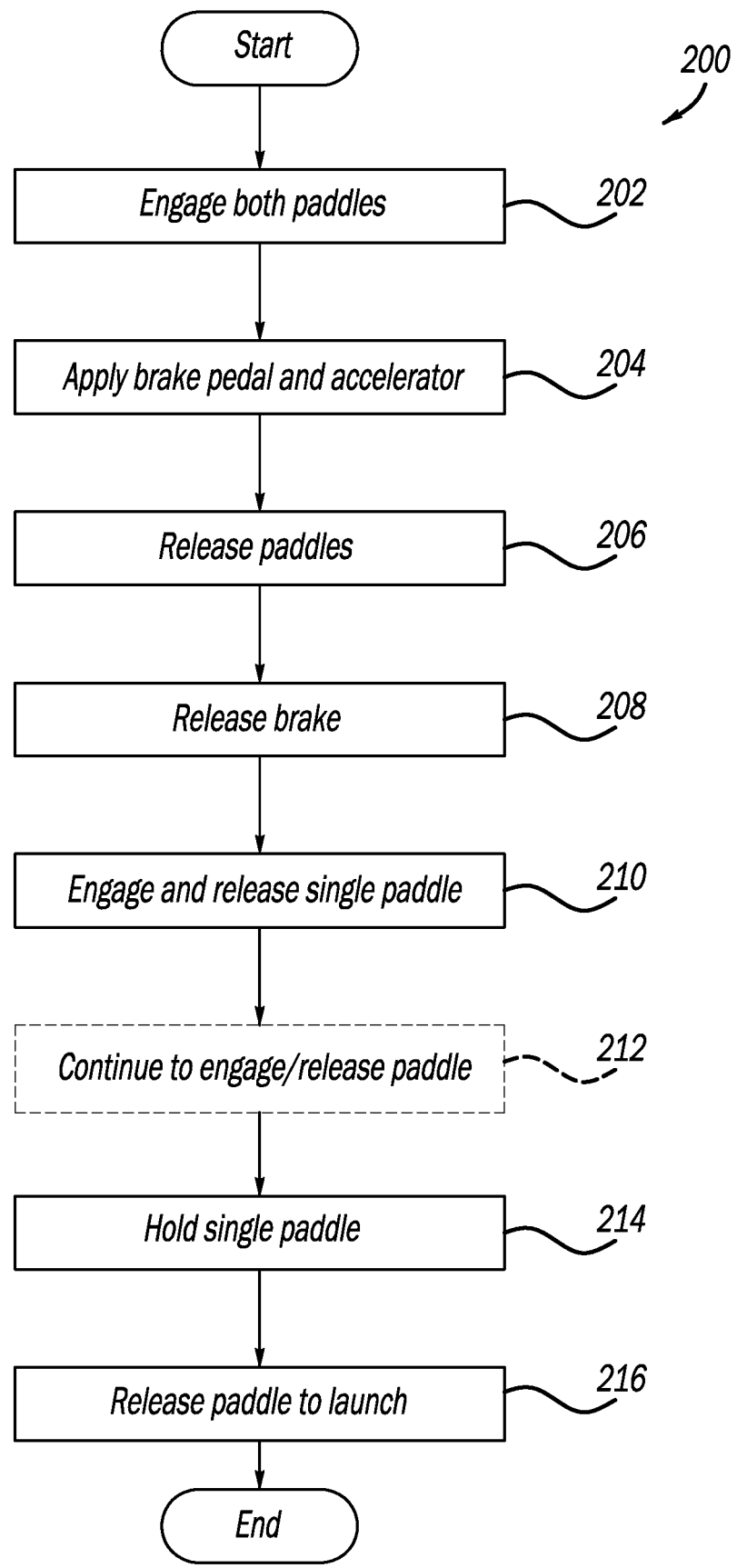
FIG. 3 is a flow diagram of an example launch control method of the vehicle system of FIG. 1, in accordance with the principles of the present application.

FIG. 3 illustrates one example method 200 of operating the transbrake control system 12 with the transbrake creep feature. The operation may be performed at a drag race stage area, which includes first and second staging lights, also known as pre-stage and stage lights. The method 200 begins once the driver moves the vehicle 10 forward until the first staging light turns ON. At step 202, the driver engages (e.g., presses/pulls) both paddles 130. At step 204, the driver simultaneously applies the brake pedal 134 and the accelerator pedal 72. At step 206, the driver releases the paddles 130, which commands the transmission 22 to apply the transbrake. At step 208, the driver releases the brake pedal 134 and maintains the accelerator pedal position (e.g., at wide open throttle).

To move the vehicle 10 forward to the second staging light, at step 210, the driver momentarily engages and releases an actuator, such as one of the paddles 130. This commands the transmission 22 to disengage to a predefined pressure for a calibratable predetermined amount of time (e.g., 0.5 sec) to creep (move) the vehicle 10 forward a predetermined distance (e.g., less than two inches or 1-2 inches). Once the predetermined time elapses, the transmission 22 automatically re-engages the transbrake.

The predetermined amount of time may be calibrated based on launch RPM and/or launch torque. For example, the time between disengagement and re-engagement of the transbrake may be based on a calibratable table as a function of launch speed, where as launch RPM increases, the predetermined time decreases. In some configurations, the predetermined time is the same regardless of how long the driver holds the single paddle 130 or even if the paddle 130 is not released. However, in order to perform a subsequent creep movement, the paddle 130 must be released and the paddle 130 re-engaged. In alternative configurations, the transbrake creep feature may be initiated via a shifter+/−98 (FIG. 2), a cruise resume button 99 (FIG. 2), or any other suitable actuator. At optional step 212, the driver engages/releases the paddle 130 one or more times as necessary to perform the vehicle creep movement until the second staging light is ON.

At step 214, once the second staging light is ON and the transbrake is re-engaged, the driver holds one paddle 130 in engagement while maintaining the accelerator pedal position to put the engine 18 in torque reserve at launch RPM. At step 216, the driver releases the paddle 130 to command the transmission 22 to disengage the transbrake and launch the vehicle.

Described herein are systems and methods for a transmission brake creep feature to slightly move a vehicle forward during race staging. The transbrake creep feature enables the driver to momentarily toggle the transbrake off via the paddle shifter or other button to move the vehicle forward from the first staging light to the second staging light while keeping the transbrake active and the engine in the proper torque window for vehicle launch.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A launch control system for a vehicle having a powertrain, the launch control system comprising:
   a transmission configured to selectively perform a transbrake operation to temporarily lock the transmission to hold the vehicle stationary while an engine throttle position is increased for a vehicle launch;
   an actuator configured to initiate a transbrake creep operation; and
   a controller in signal communication with the transmission and the actuator, and configured to:

command the transmission to perform the transbrake operation;
receive a signal from the actuator indicating a request to initiate the transbrake creep operation; and
command the transmission to momentarily disengage the transbrake for a predetermined period of time to enable the vehicle to perform the transbrake creep operation and move the vehicle forward while maintaining the increased engine throttle position.

2. The launch control system of claim 1, wherein the controller is further configured to command a re-engagement of the transbrake after expiration of the predetermined time period.

3. The launch control system of claim 1, wherein the predetermined period of time is based on a launch RPM of the vehicle to thereby move the vehicle a predetermined distance during the transbrake creep operation.

4. The launch control system of claim 3, wherein the predetermined distance is between approximately one and approximately two inches.

5. The launch control system of claim 1, further comprising first and second steering wheel paddle shifters in signal communication with the controller, wherein the actuator is the first steering wheel paddle shifter.

6. The launch control system of claim 5, wherein the controller is configured to command the transbrake creep operation when the first paddle shifter is engaged during the transbrake operation.

7. The launch control system of claim 6, wherein the controller is configured to command the transbrake operation when:
the first and second steering wheel paddle shifters are engaged;
a brake pedal and an accelerator pedal are subsequently applied; and
the first and second steering wheel paddle shifter are subsequently released.

8. The launch control system of claim 5, wherein the controller is configured to release the transbrake and launch the vehicle when:
the transbrake is engaged;
the second paddle shifter is subsequently engaged while maintaining the increased throttle position; and
the second paddle shifter is subsequently released.

9. The launch control system of claim 1, wherein during the predetermined period of time, the transbrake is disengaged to a predetermined pressure based on a launch RPM of the vehicle.

10. A launch control method for a vehicle having a powertrain, the method comprising:
commanding, by a controller, a transmission to perform a transbrake operation to temporarily lock the transmission to hold the vehicle stationary while an engine throttle position is increased for a vehicle launch;
receiving, by the controller, a signal from an actuator indicating a request to initiate a transbrake creep operation; and
commanding, by the controller, the transmission to momentarily disengage the transbrake for a predetermined period of time to enable the vehicle to perform the transbrake creep operation and move the vehicle forward while maintaining the increased engine throttle position.

11. The method of claim 10, further comprising commanding, by the controller, a re-engagement of the transbrake after expiration of the predetermined time period.

12. The method of claim 10, wherein the predetermined period of time is based on a launch RPM of the vehicle to thereby move the vehicle a predetermined distance during the transbrake creep operation.

13. The method of claim 12, wherein the predetermined distance is less than two inches.

14. The method of claim 10, wherein the vehicle includes first and second steering wheel paddle shifters in signal communication with the controller, wherein the actuator is the first steering wheel paddle shifter.

15. The method of claim 14, wherein the controller is configured to command the transbrake creep operation when the first paddle shifter is engaged during the transbrake operation.

16. The method of claim 15, wherein the controller is configured to command the transbrake operation when:
the first and second steering wheel paddle shifters are engaged;
a brake pedal and an accelerator pedal are subsequently applied; and
the first and second steering wheel paddle shifter are subsequently released.

17. The method of claim 14, wherein the controller is configured to release the transbrake and launch the vehicle when:
the transbrake is engaged;
the second paddle shifter is subsequently engaged while maintaining the increased throttle position; and
the second paddle shifter is subsequently released.

18. The method of claim 10, wherein during the predetermined period of time, the transbrake is disengaged to a predetermined pressure based on a launch RPM of the vehicle.

* * * * *